United States Patent
Raghuram et al.

(10) Patent No.: US 6,334,985 B1
(45) Date of Patent: Jan. 1, 2002

(54) STATIC MIXING REACTOR FOR UNIFORM REACTANT TEMPERATURES AND CONCENTRATIONS

(75) Inventors: Srikantiah Raghuram, New Delhi (IN); Ismail B. Cetinkaya, Palatine, IL (US)

(73) Assignee: UOP LLC, Des Plaines, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/135,682

(22) Filed: Aug. 18, 1998

(51) Int. Cl.⁷ .............................. F28D 3/00; F28D 7/00; B01F 3/04
(52) U.S. Cl. ..................... 422/224; 422/200; 422/228; 165/166; 165/167
(58) Field of Search .................. 422/200, 224, 422/228, 312, 198, 189, 201, 191; 165/166, 167, 170, 165; 366/340, 147, 337

(56) References Cited

U.S. PATENT DOCUMENTS

| | | | | |
|---|---|---|---|---|
| 3,610,330 A | * | 10/1971 | Nasser | 165/166 |
| 3,901,659 A | * | 8/1975 | Joklik et al. | 430/122 |
| 4,314,606 A | * | 2/1982 | Muller et al. | 165/163 |
| 4,374,542 A | * | 2/1983 | Bradley | 165/166 |
| 4,667,734 A | * | 5/1987 | Langle | 165/145 |
| 4,739,826 A | * | 4/1988 | Michelfelder et al. | 165/133 |
| 4,820,495 A | * | 4/1989 | Vu et al. | 422/148 |
| 4,919,541 A | * | 5/1990 | Grosz-Roell et al. | 366/136 |
| RE34,255 E | * | 5/1993 | Friedrich | 366/337 |
| 5,320,428 A | * | 6/1994 | Streiff | 366/337 |
| 5,409,672 A | | 4/1995 | Cetinkaya | 422/189 |
| 5,525,311 A | | 6/1996 | Girod et al. | 422/200 |
| 5,538,700 A | | 7/1996 | Koves | 422/200 |
| 5,755,280 A | * | 5/1998 | Da Costa et al. | 165/140 |

FOREIGN PATENT DOCUMENTS

| | | | |
|---|---|---|---|
| FR | 2733823 | * | 5/1995 |
| JP | 3241290 | * | 10/1991 |

* cited by examiner

Primary Examiner—Marian C. Knode
Assistant Examiner—Alexa A. Doroshienk
(74) Attorney, Agent, or Firm—John G. Tolomei; James C. Paschall

(57) ABSTRACT

A tubular reactor passes a flowing stream of reactants through a plurality of mixing devices that simultaneously provide indirect heat exchange of the reactants to improve the uniformity of reactant temperatures and concentrations. The mixing devices provide intimate mixing by passing the reactants through a plurality of narrow channels defined by parallel plate elements that channel a heat exchange fluid on their opposite side to provide the simultaneous indirect heat exchange. The heat exchange channels can have any desired degree of mixing intensity by providing irregularities in the channel walls or flow path that supply the desired degree of fluid shear. Preferably the mixing reactor provides a series of mixing devices with heat exchange along the length of the conduit flow path with space between the devices for remixing of the fluid reactants.

8 Claims, 5 Drawing Sheets

STATIC MIXING REACTOR FOR UNIFORM REACTANT TEMPERATURES AND CONCENTRATIONS

FIELD OF THE INVENTION

This invention relates to reactor arrangements having means for mixing reactants and to the heating of reactants in such reaction zones.

BACKGROUND OF THE INVENTION

There are many homogenous or heterogeneous chemical reactions involving liquid and/or gas vapor phases that benefit from the intimate mixing of the reactants in the reaction zone.

This intimate mixing is usually supplied by a tubular reactor. These reactors consist of a long conduit into which the reactants are injected. Mixing of the reactants occurs as they flow down the conduit. The design requirements for these reactors include the variables of temperature, degree of mixing and residence time. Direct or indirect heat transfer may be employed to control temperature conditions within the tubular reactor. For example it is known that such reactors may be externally jacketed to circulate a heat exchange medium on the outside surface of an extended reaction conduit and thereby provide indirect heating or cooling over the entire external surface of the reactor.

The primary variables influencing the design of the mixing reactors are the degree of mixing, the residence time, and the temperature of the reaction. The length of the conduit or pipe is usually sized to control residence time. The degree of mixing is largely a function of the flow regime within the conduit. In open tubular reactors the diameter largely controls the flow regime therein. Thus optimal velocity for tubular reactions is established when the pipe diameter correctly keeps the flow in the desired flow regime within a pipe or conduit having a length that provides the proper residence time for the reaction. The temperature depends on the heat of reaction and the degree to which heat may be added or withdrawn via intermediate injection of reactants or diluents and the availability of indirect heat exchange.

External heating and the addition of fluids do not always offer satisfactory temperature control. Since many mixing reactors depend on high fluid velocities through the reaction zone, processes with high heats of reaction may not receive enough heat flux to maintain optimum temperatures without exceeding local temperature limitations for the reactants. The direct addition of heating or cooling fluids may also interfere with process control by varying the velocity and residence time through the reaction zone as well as composition concentrations.

The requirements for mixing and residence time are also not always fully compatible, and therefore, the diameter of the conduit containing a mixing reactor may represent a compromise in optimum values to control mixing and residence time. In addition, many tubular reactors require very long pipe lengths at high velocities to achieve the necessary mixing. One means of overcoming the incompatibility in the flow regime or residence time and long length requirements is the use of internal mixers within a tubular reactor or other reaction zone. Internal mixing devices include stirred reactors and static mixers.

In some cases, conduit or tubes of mixing reactors are also unable to provide the intensity of the mixing that may be important for certain reactions. In order to overcome mass transfer limitations, many reactions that require intimate mixing of reactants also require the mixing be accomplished with a high degree of shear forces between the fluids. The high shear forces create the necessary phase dispersion to overcome mass transfer limitations inherent in the fluids and to provide the contacting necessary for precise reaction control.

Stirred tank reactors in many cases may provide the necessary shear forces to eliminate mass transfer limitations. However, stirred tank reactors often provide unwanted areas of stagnation that allow variations in residence time and degrade the products obtained from certain reactions. In addition, the mechanical elements of stirred tank reactors may prove troublesome. When operating at high pressure, impeller shaft seal leakage is particularly difficult to prevent.

Static mixers are commonly used to supply additional mixing energy to the reactor instead of mechanical stirred reactors. These types of static mixers include simple static mixers, fluidic mixers and vortex mixers. Simple static mixers are effective in forming and dispersing gas bubbles in a statistical distribution.

U.S. Pat. No. 5,409,672 issued to Centinkaya shows a static mixer arrangement provides a high fluid shearing while minimizing pressure drop.

U.S. Pat. No. 5,538,700 issued to Koves shows an arrangement of corrugated plates that use a perforated insert plate to introduce additional turbulence into heat exchange channels.

U.S. Pat. No. 5,525,311 issued to Girod et. al. show a process and arrangement that uses plates to defined a plurality of catalyst retaining channels for processing a reactant stream interleaved with a plurality of channels that receive a heat exchange fluid.

BRIEF SUMMARY OF THE INVENTION

It is an object of this invention to provide a mixing type reactor that can provide intimate mixing and efficient internal heat exchange.

It is a further object of this invention to provide a mixing type reactor that can provide intimate mixing and simultaneous internal heat exchange with a desired degree of fluid shearing.

This invention is a mixing reactor that passes a flowing stream of reactants through a plurality of mixing devices that simultaneously provide indirect heat exchange of the reactants. The mixing devices provide intimate mixing by passing the reactants through a plurality of narrow channels defined by parallel plate elements that channel a heat exchange fluid on their opposite side to provide the simultaneous indirect heat exchange. The heat channels can have any desired degree of mixing intensity by providing irregularities in the channel walls or a flow path that supplies the desired degree of fluid shear. Preferably the mixing reactor provides a series of mixing devices with heat exchange along the length of the conduit flow path with space between the devices for remixing of the fluid reactants. Thus, the degree of stirring required by the reaction can be intensified by the addition of the required number of mixing devices positioned along the flow path through the tube or conduit of the reactor. The additional stages of mixing or shear may be added to continue mixing components as reactants are produced or to maintain dispersion as additional reagents or catalysts are added between stages of mixing or as intermediate fluids are withdrawn from the reactor.

Accordingly, in one embodiment this invention is an apparatus for the plug flow reaction of one or more reactants in the presence of gas, liquid or mixed phase fluids. The apparatus includes a containment conduit having an inlet and an outlet end for passing fluid from the inlet end to the outlet end and establishing a flow direction through the conduit. At least two spaced apart mixing sections comprising a plurality of spaced apart plates definine heat exchange flow channels and reactant flow channels, the plates retain turbulence inducing structures that extend transversely across the reactant flow channels and the plates define reactant channel inlets for the reactant channels at the upstream end of the mixing sections and define reactant channel outlets for the reactant channels at the end of the mixing section opposite the reactant channel inlets. A distribution manifold for distributes a heat exchange fluid to the sides of the heat exchange channels. A collection manifold for collects a heat exchange fluid from the sides of the heat exchange channels.

In a more specific embodiment this invention comprises an apparatus for the plug flow reaction of one or more reactants in the presence of a gas, a liquid or mixed phase fluids. The apparatus includes at least three chamber conduit sections defining connecting volumes for passing a reactant stream from a contactor inlet, through at least two mixing devices and out of the contactor outlet and establishing a reactant flow path. A plurality of parallel plates, spaced apart in a stacked arrangement, form a plurality of reactant flow channels interleaved with a plurality of heat exchange channels in each mixing device and provide each mixing device with a rectilinear profile transverse to the reactant flow path. The plates retain turbulence inducing structures that extend transversely into the reactant flow channels. The plates define reactant channel inlets for the reactant channels at the upstream end of the mixing device and reactant channel outlets for the reactant channels at the end of the mixing device opposite the reactant channel inlets. The plates define a heat exchange inlet on one side of the heat exchange channels and a heat exchange outlet on the opposite side of the heat exchange channels. A first curved containment section having a concave side defines a distribution manifold over the heat exchange inlet side of each mixing device for distributing a heat exchange fluid to the sides of the heat exchange channels. A second curved containment section having a concave side defining a collection manifold over the heat exchange outlet side of each mixing device collects a heat exchange fluid from the sides of the heat exchange channels.

Additional objects, embodiments and details of this invention are disclosed in the following detailed description of the invention.

DETAILED DESCRIPTION OF THE INVENTION

The apparatus of this invention is useful for many tubular reactor applications. Processes suitable for the use of this apparatus will pass liquid, gaseous, or mixed phase fluids together through a tubular reactor. The fluid components may be reactants, catalysts, diluents or any other process stream. Processes carried out in the conduit of the reactor may operate at high or low temperatures in a wide range of pressure conditions including partial vacuums and critical pressure conditions. The fluids passing through the conduit of the reactor may also include liquids having fine particles dispersed therein. Such solids are usually particulate catalysts. Suitable reactor arrangement will not ordinarily retain a fixed or compact moving bed of particulate catalyst.

An example of a suitable process for the reactor of this invention is oligomerization of ethylene to linear alpha-olefins by a homogeneously catalyzed reaction. The reaction is highly exothermic and a typical process of this type commonly requires contact between two liquid phase streams and one vapor phase stream. It is also necessary to maintain uniformity of mixing for product selectivity purposes.

Figure 1:
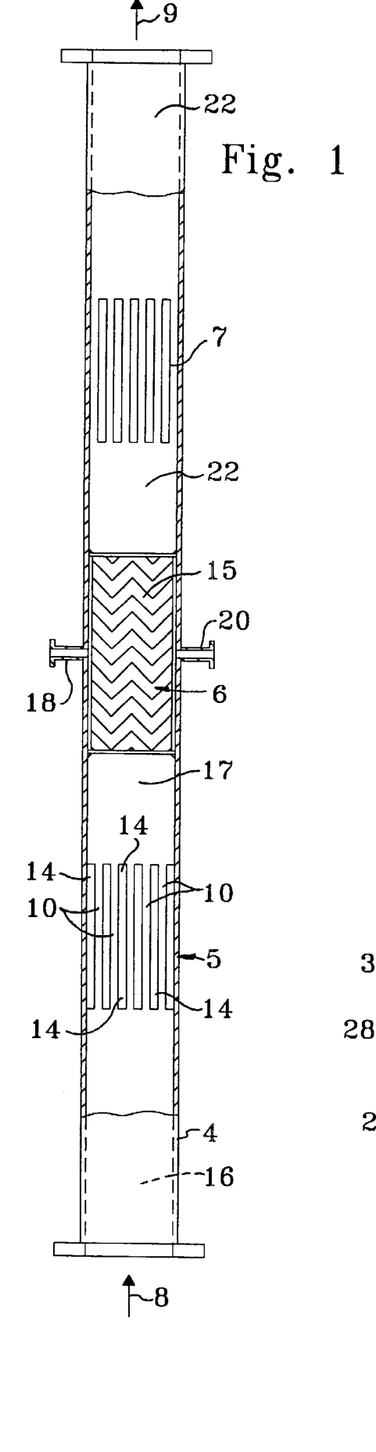
FIG. 1 illustrates a tubular reactor of this invention and shows the mixing device in a cut-away view.

FIG. 1 shows the apparatus of this invention. As depicted in FIG. 1, the apparatus includes a tubular reactor in the form of an elongated conduit 4 that provides the containment conduit for the tubular reactor. The tubular reactor houses multiple mixing devices 5, 6, and 7. A fluid stream enters the tubular reactor through the bottom of conduit 4 via an inlet 8 and exits the top of the conduit 4 through an outlet 9. Fluid that flows into the conduit 4 from inlet 8 first enters an upstream chamber 16 defined as the volume between inlet 8 and mixing device 5. Reactant fluid flow from chamber 16 next enters a plurality of channels 10 having open bottoms and tops for fluid flow therethrough. The walls of channels 10 are irregular to provide turbulence and mixing of the fluid as it passes up the channels. Heat exchange channels 14 extend between reaction channels. A heat exchange fluid passes through channels 14 to simultaneously heat or cool the reactants in the reaction channels 10. The tops and bottoms of heat exchange channels 14 are closed to fluid flow and independent nozzles or preferably, as hereinafter more fully illustrated, a manifold system distributes and collects the heat exchange fluid at each mixing device location. As fluid continues to pass upwardly out of mixing device 5 it enters an intermediate chamber 17 defined as the space between mixing devices 5 and 6. Intermidiate chamber 17 series as a mixing device provides a zone for recombination of the reactant flow from the reactant channels of mixing device 5. Continued upward flow passes the reactant fluid to mixing device 6 which further mixes the reactant fluid while simultaneously heating or cooling the reactant fluid with a heat exchange fluid.

This invention can use any type of plate to define the reaction channels and the heat exchange channels. By necessity, suitable plates have minimum thickness to promote rapid heat exchange across the plates and to minimize the amount of cross sectional flow area removed from the conduit reactor by the presence of the plates in the mixing devices. Maintaining channel widths between the plates can be accomplished by using various spacers. The spacers between the plates have the advantage of providing additional surface and edges for introducing any desired shearing forces on the fluid as it passes through the mixing devices. Suitable spacers also can provide a controlled degree of turbulence for the reactants as they pass through the reaction channels. Turbulence from spacers also helps promote heat exchange by introducing turbulence into both the heat exchange fluid and the reactant fluids. Typically, the heat exchange channels and reaction channels will have an average width in a range of from a ¼ to 2 inches.

Suitable plates for this invention will comprise any plates that allow a high heat transfer rate and that are easily secured in the reaction section in a stable configuration that readily retains the channel arrangement. Thin plates are preferred and usually have a thickness of from 1 to 2 mm. The plates are typically composed of ferrous or non-ferrous alloys such as stainless steel. Each plate has some means of introducing turbulence and preferably has corrugations that are inclined to the flow of reactants and heat exchange fluid.

The plates may be formed into curves or other configurations, but flat plates are generally preferred for stacking purposes.

A preferred form of the plate elements consists of corrugated plates. Corrugated plates, when stacked next to each other, have the advantage of defining the channel spacing while simultaneously supporting the adjacent plate elements and providing a complex flow path that introduces turbulence mixing to the fluid. The corrugated plates may be stacked directly next to each other with the space between corrugations defining alternate reactant channels and heat exchange channels. Where plates contain inclined corrugations, the plates may be stacked next to each other to define the heat exchange and reactant flow channels as the area between corrugations. Preferably the corrugation pattern will be reversed between adjacent plates so that a herring bone pattern on the faces of opposing corrugated plates will extend in opposite directions and the opposing plates faces may be placed in contact with each other to form the is flow channels and provide structural support to the plate sections.

In the case of corrugated plates the corrugation pattern may be varied to achieve a variety of contacting and reaction effects. Such effects include increased turbulence for improving the contacting between the components by varying the pitch of the corrugation. The degree of turbulence may also be controlled by varying the amplitude of the corrugations and the frequency of the corrugations, which are otherwise referred to as the pitch and the depth of the corrugations. Corrugations having a large pitch or low frequency and shallow depth or low amplitude will provide a low degree of turbulence. Increasing either or both of the frequency and amplitude will raise the degree the turbulence. Suitable corrugated plates are described in detail in U.S. Pat. No. 5,525,311; the contents of which are hereby incorporated by reference. The average channel width for reactant channels of this invention will typically range of from ¼ to 2 inches when using corrugated plates. The average width of the corrugated plates is most accurately computed by calculating the volume of the channel and dividing it by the transverse cross sectional area of the channel.

Mixing device 6 contains reactant and heat exchange channels essentially identical to those shown in mixing device 5 except for their orientation. The channels 10 and 14 in mixing device 5 extend in a direction perpendicular to the section of FIG. 1. The channels of mixing device 6 extend in the same direction as the section of FIG. 1. The ninety degree change in orientation of the reactant and heat exchange channels between mixing devices 5 and 6 further promotes intermixing of the reactant fluid between mixing stages. Accordingly, FIG. 1 shows the transverse profile of one heat exchange plate 15 in mixing device 6 and the corrugated surface defined thereon which introduces turbulence into the fluid passing through the reactant and the heat exchange channels. The heat exchange fluid is supplied to the heat exchange channels of mixing device 6 via a nozzle 18 and withdrawn from the heat exchange channel via a nozzle 20. After heating or cooling by the heat exchange fluid, mixing device 6 discharges the reactant fluid into a downstream chamber 22.

Downstream chamber 22 is the volume of conduit 4 between mixing device 6 and the outlet 9. Both upstream chamber 16 and downstream chamber 22 may contain additional mixing devices. FIG. 1 illustrates downstream chamber 22 with an additional mixing device 7 with channels oriented 90 degrees from the channels in mixing device 6 and through which the reactant fluid passes on its upstream course to outlet 9. In a highly preferred embodiment, the apparatus of this invention will have at least 3 and as many as 10 or more of the mixing devices. Chambers 16, 17, and 22 can provide means for and may contain additional mixing devices that do not have indirect heat exchange capacity. However, apart from any means for adding or withdrawing fluids, chambers 16, 17, and 22 usually provide means for unobstructed fluid flow between mixing devices in the chambers. Thus, the chambers between mixing devices are normally open for free flow of fluids except for any small intermediate inlet or outlet nozzles (not shown).

Intermediate inlet or outlet nozzles for withdrawing fluids from the conduit 4 at locations intermediate to inlet end 8 and outlet end 9 are normally positioned between the mixing devices. Fluids may be added to supply additional reactants or diluents for reaction control. Fluids may also be withdrawn, heated or cooled, and returned to conduit 4 for purposes of temperature control. The addition or withdrawal of fluids through intermediate nozzles will not ordinarily contribute significantly to mixing or dispersion of the fluids between the mixing devices.

The operation of the mixing devices of this invention is often enhanced by the presence of the gaseous medium which breaks the liquid up into fine droplets. The invention can operate in a large range of relative liquid to gaseous composition. Preferably, the quantity of gaseous material is at least equal to 0.2 wt. % of the combined mixture. In operations of the reactor wherein all of the process streams are in normally in liquid phase, changes to the process may be effected to promote high shear mixing by the addition of gases. The high shear force enhancement of gases may be obtained by injecting an inert gas with the liquids entering the reactor. Injection of the gas with the liquids may be regulated to obtain a controlled level shear force with relatively constant pressure drop.

In this arrangement, sequential mixing of increased severity can be provided by varying the plate arrangement and/or shearing elements in each mixing device along the fluid flow path through the reactor. As a result repeated mixing and varied intensity mixing can be achieved through multiple mixing devices within a single conduit 4.

Regardless of the number of mixing devices contained within conduit 4, the upstream and downstream chamber will preferably have an open length equal to at least twice the inside diameter of conduit 4. This open length prevents direct injection or direct withdrawal from any of the mixing devices so that each mixing device fully performs its function.

Figure 2:
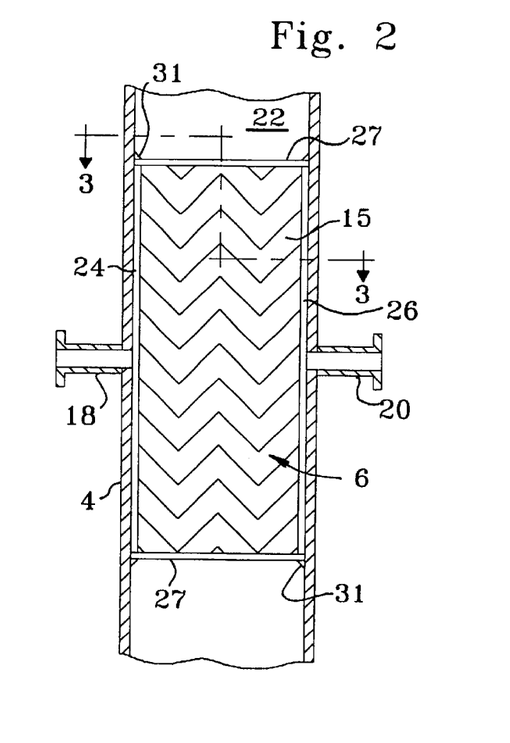
FIG. 2 is an enlarged cross-section of one of the mixing devices shown in the cut-away view of FIG. 1.
Figure 3:
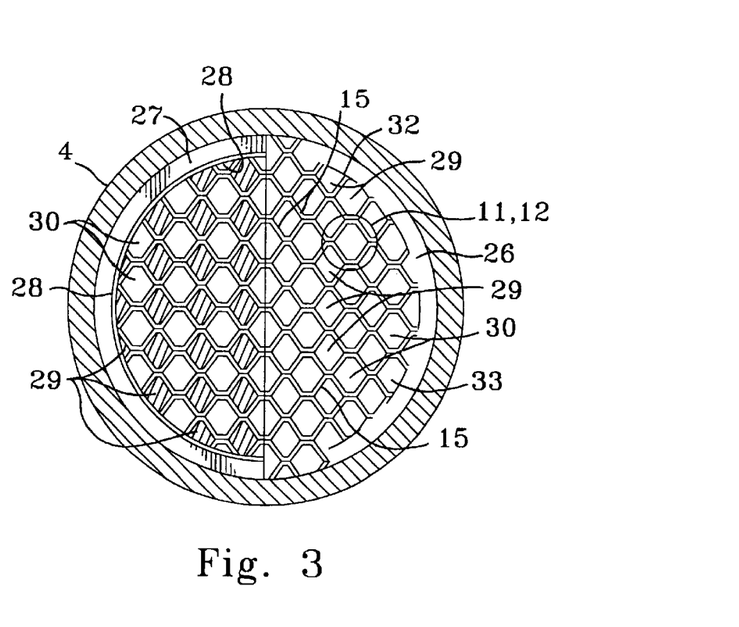
FIG. 3 is a split section of the upper portion of the mixing device shown in FIG. 2 taken over lines 3—3.

Nozzles 18 and 20 provide one means for passing a heat transfer fluid through a narrow system of isolated heat exchange channels while maintaining open tops and bottoms of reactant channels for continuous fluid flow therethrough. FIGS. 2 and 3 show a manifolding arrangement that allows insertion of the plurality of narrow heat exchange channels into the conduit of the reactor. Looking then at FIG. 2, nozzle 18 delivers an inflow of heat exchange fluid to a distribution space 24 having open communication with the heat exchange channels across the sides thereof while being blocked from communication with the reactant channels across the same surface. Similarly, nozzle 20 withdraws heat exchange fluid from a collection space 26 which again has open communication with the heat exchange channels across the sides of plates 15 while the spaces between plates 15 are closed to communication with the reactant channels.

As more fully appreciated from FIG. 3, the bundle of corrugated plates 15 defining the heat exchange and reactant channels are placed next to each other to build a stack of plates defining the alternate heat exchange and reactant channels. The entire stack of plates 15 may be joined at the top and bottom by a ring 27 that is sealed around its inner edge 28 to the heat exchange channels 29 and the reactant channels 30. The entire mixing device 6 may be assembled outside of the tube 4 and inserted into the tube at the location of nozzles 18 and 20. Seal welds 31 at the top and bottom of mixing device 6 prevents any mixing between the heat exchange fluid and the reactant stream.

The separate communication of the heat exchange channels and reactant channels with the heat exchange and reactant fluid respectively can again be more fully appreciated from FIG. 3. The upper portion of split section 3-3 shows the heat exchange channels 29 closed to communication with the upper chamber 22 to isolate the heat exchange fluid from the reactant fluid. Similar closure of the heat exchange channels is provided at the bottom of the mixing device 6. The reactant channels 30 are open at both the top and the bottom of mixing device 6. As shown on the right side of FIG. 3, heat exchange fluid is selectively collected only from heat exchange channels 29 by closing the side of reactant channels 30 across openings 32 at the sides where the reactant channels 30 encounter the collection space 26. Conversely, the ends 33 where the heat exchange channels end at collection space 26 have openings 33 for open communication therewith. Plates 15 are stacked in a direction transverse to the channels such that the plates press against the inside wall of tube 4. Pressing the plates against the inside wall of tube 4 prevents bypassing of the heat exchange fluid by at least partially blocking the flow of heat exchange fluid between the transverse side of the stacked plates and the inside of tube 4. A complete blockage of heat exchange flow at this section is not necessary or desired in order to maintain a good distribution of the heat exchange fluid across all of the heat exchange channels 29. Distribution channel 24 has a similar arrangement of openings and closures with the heat exchange channels and reactant channels as those shown for collection space 26.

Figure 4:
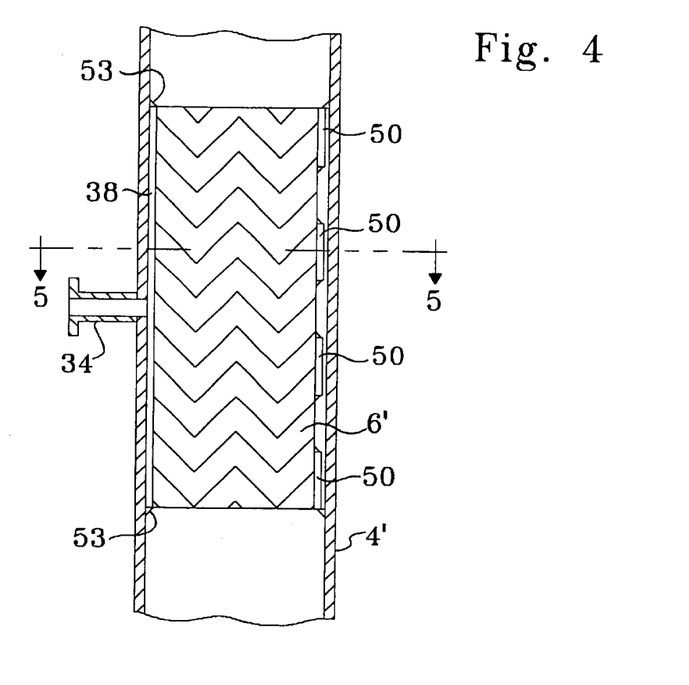
FIG. 4 is a modified cross section of the mixing device shown in FIG. 2.
Figure 5:
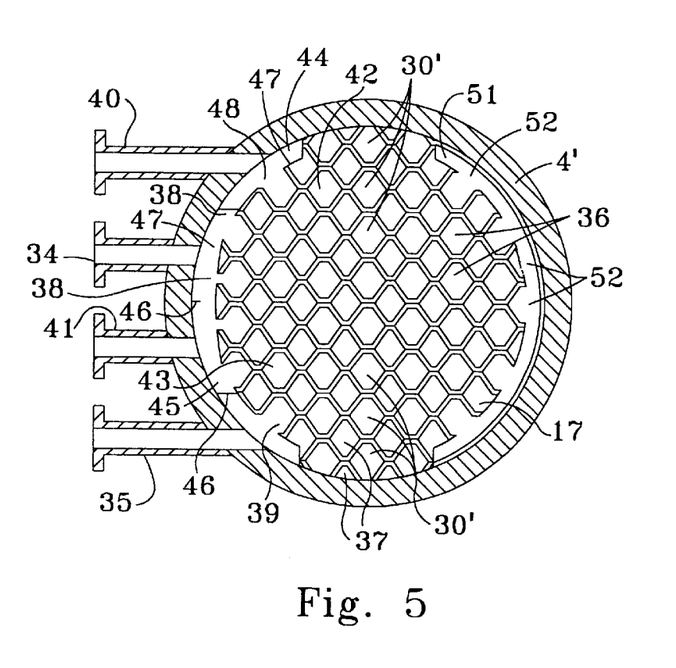
FIG. 5 is a section of FIG. 4 taken at line 5—5.
Figure 6:
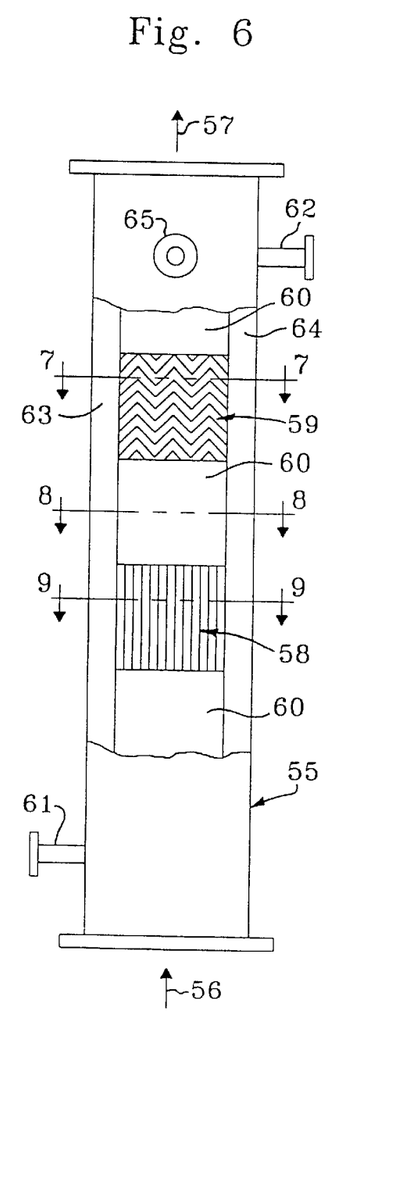
FIG. 6 is an alternate arrangement for a mixing conduit reactor of this invention.

FIGS. 4 and 5 show a modified mixing device 6' similar to that shown in FIGS. 1–3. FIGS. 4 and 5 differ by showing an alternate method for circulating the heat exchange fluid through the heat exchange channels. The arrangements shown in FIGS. 4 and 5 collects and withdraws the heat exchange fluid from a single side of a containment tube 4'. Nozzles 34 and 35 supply heat exchange fluid to heat exchange channels 36 and 37, respectively, through distribution spaces 38 and 39. Nozzles 40 and 41 collect heat exchange fluid from heat exchange channels 42 and 43, respectively, through collection spaces 44 and 45. A series of partitions 46 separate the collection spaces from the distribution spaces. Similar to that described in FIG. 3, closures 47 prevent fluid from entering the reactant channels 30' while openings 48 permit free flow of heat exchange fluid to the collection spaces 44 and 45. A series of radially extending manifolds 50 interconnect the heat exchange channels 36 and 37 that receive the incoming heat exchange fluid with the heat exchange channels 42 and 43 from which the heat exchange fluid is collected. Manifolds 50 have closures 51 where the manifolds register with the sides of the reactant channels 30' and openings 52 where the manifolds register with the heat exchange channels. Openings 52 function in a manner analogous to that described for openings 38, 39, 45, and 48. Manifolds 50 are shown as intermittently spaced down the side of mixing device 6' that lies opposite the distribution and collection spaces. Connecting manifold 50 may have completely open interiors since there is no need to control fluid flow from the different collection or distribution nozzles. Manifold 50 may be either intermittent as shown or cover the entire side of the mixing device 6' as a continuous manifold. Where manifold 50 is intermittently spaced, the entire side area of the reactants and the heat exchange channels are closed to fluid flow between the manifolds. Mixing device 6' may be inserted into tube 4' in a fully assembled state and secured within the tube and registered in sealing communication with the collection and distribution nozzles by providing seal welds 53 at the top and bottom of mixing device 6".

FIGS. 6–10 show a further alternate manifolding arrangement for use with a square conduit arrangement that retains the mixing devices in the conduit reactor. In this arrangement reactants again flow axially through the conduit 55 from an inlet 56 to an outlet 57. Internally, conduit 55 retains mixing devices 58 and 59 between open mixing chambers 60. Mixing devices 58 and 59 contain a similar arrangement of channels that alternately retain heat exchange fluid or provide passage of the reactants axially through the reactor conduit 55. Again, mixing devices 58 and 59 alternate the orientation of the reactant channels by 90 degrees relative to each other. Fluid is supplied to mixing device 59, and any similarly oriented mixing devices (not shown), by a nozzle 61 via a distribution space 63 while a distribution space 64 withdraws heat exchange fluid from mixing device 59 for removal via nozzle 62. A nozzle 66 (See FIGS. 7–9) provides heat exchange fluid to mixing device 58 and a nozzle 65 withdraws a heat exchange fluid that has passed through mixing device 58. Distribution and collection manifold spaces, similar to those shown for mixing device 59, communicate mixing device 58 with nozzles 66 and 65.

Figure 7:
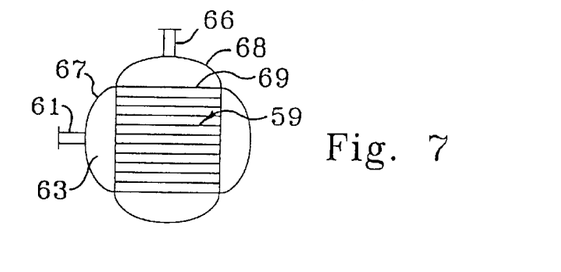
FIGS. 7 and 8 are sections of FIG. 6 taken at lines 7—7 and 8—8, respectively.
Figure 8:
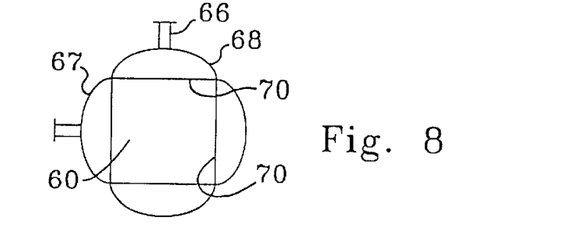
Figure 9:
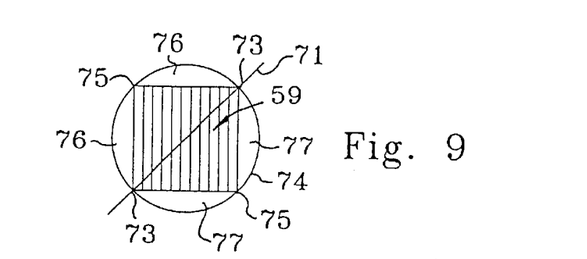
FIG. 9 is a modified cross section of a mixing device taken at line 9—9 of FIG. 6.

As can be more fully appreciated from FIGS. 7–9, the reactor-conduit arrangement of FIGS. 6–10 accommodates a square or rectangular reactor design. The square design facilitates fabrication and assembly of the necessary plate elements. As more fully seen from FIG. 7–10, a curved channel 67 may provide the manifold space 63. The sides of the reaction channels that meet with the manifold spaces 63 are again closed to communication with the heat exchange fluid. Sealing the ends of curved channel 67 at the corners of mixing devices 59 furnishes an efficient shape for withstanding internal pressure while also providing a convenient method for distribution of fluids. Having channels extending on all four sides of the mixing conduit arrangement 55 conveniently affords a pressure balancing function for the relatively thin plates that define the heat exchange channels. Specifically, when looking at FIG. 7, the curved channel 68 balances the pressure on outermost plates of mixing devices 59 to minimize any pressure loading across the flat surface of the plate and thereby prevents deformation without requiring a thick plate gauge. Looking at FIG. 8, the curved channels 67 and 68 also contribute support to the walls 70 of the open chamber sections 60 that have a flat profile and poor pressure loading capability.

FIG. 9 shows a modified form of the invention where an outer circular conduit or pipe furnishes the curved chamber portions. The inside diameter of the pipe 74 slightly exceeds the diagonal dimension across the mixing device 59. The cross section as represented in FIG. 9 can simplify the construction of the conduit reactor arrangement. The outer wall may comprise a simple pipe cut in half across the section line 71. Assembly may consist of inserting the reaction stack into the one half of pipe 74 and seal welding the mixing device therein at points 73. Longitudinally welding the other half of the pipe 74 back to the other pipe half at points 73 completes pressure containment of the reaction stack. This procedure assembles a reactor mixer with pressure balancing, distribution manifolds and collection manifolds in a highly efficient pressure resisting shape with a few simple operations. No criticality attaches to the seal between mixing devices at corners 75 since communication between adjacent distribution manifolds 76 and between adjacent collection manifolds 77 will not adversely effect the circulation of the heat transfer fluid.

Figure 10:
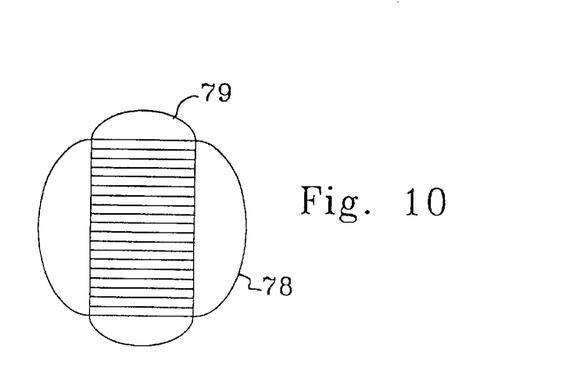
FIG. 10 is a modified cross section showing an alternate arrangement for the conduit reactor of FIG. 6.

As illustrated by FIG. 10, the mixing devices may have rectilinear shapes other than a square. Suitable curved channels 78 may accommodate any length of reactant and heat exchange channels to provide rectangles with varied aspect ratios. Smaller curved channels 79 sized to suit the minor transverse dimension of the reaction conduit may still serve a useful pressure balancing function.

The heat exchange channels and reaction channels need not have a relatively uniform or equal width. The relatively narrow dimension of most conduit reactors will typically demand less fluid volume in the heat exchange channels than in the reaction channels. Minimizing the volume in the heat exchange channels also lowers the amount of reactant flow blockage imposed by each mixing device. Unlike the channels shown in FIGS. 3 and 5, FIGS. 11 and 12 represent alternate arrangements for the stacking of the plates to define different widths for the heat exchange and reaction channels.

Figure 11:
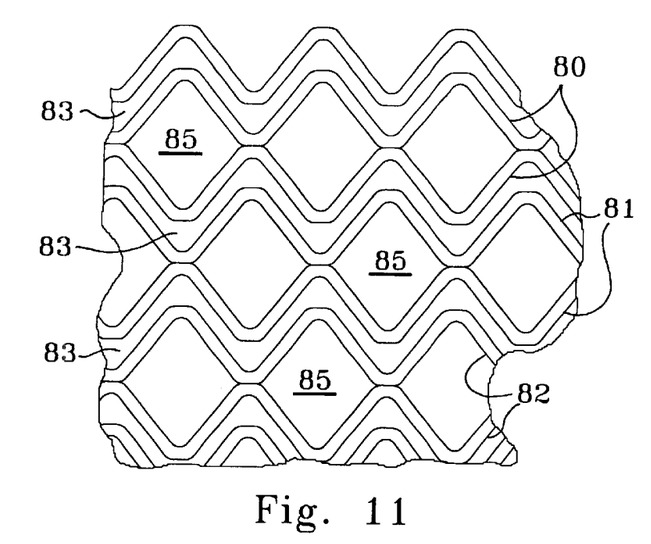
FIG. 11 is modified arrangement for reactant and heat exchange channels of this invention.

FIG. 11 depicts an arrangement for the preferred corrugated plates of this invention. As shown by FIG. 11 corrugations need not be defined so that all peaks touch. FIG. 11 shows an arrangement where an offset arrangement of corrugated plate pairs 80, 81, and 82 define smaller widths for the heat exchange channels 83 relative to reactant channels 85. The arrangement of FIG. 11 minimizes the overall reactant flow area blocked by the heat exchange channels in the mixing device.

Figure 12:
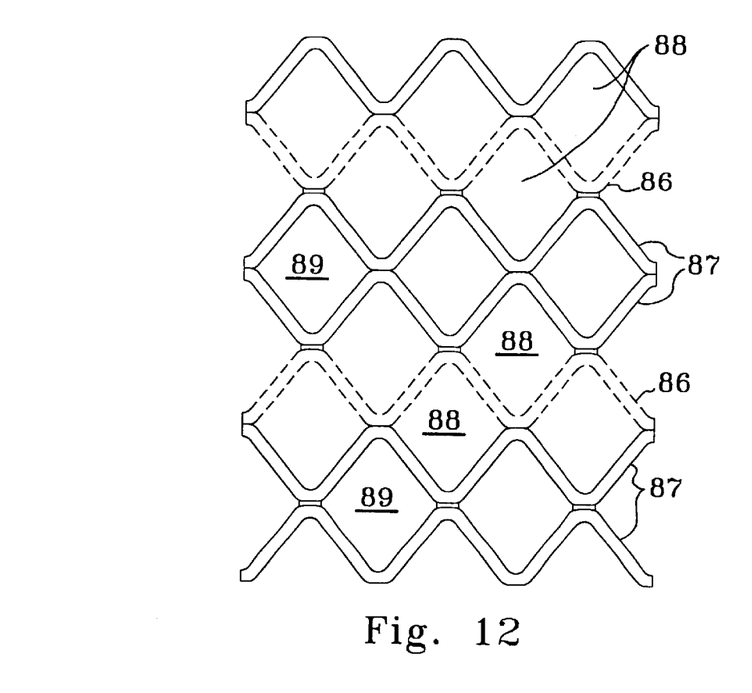
FIG. 12 is a further modification of reactant and heat exchange channels of this invention .

Alternately, as shown in FIG. 12, perforated or slotted plates 86 may be inserted between pairs 87 of solid plates to increase the proportion of reactant flow area in the mixing device. Perforated plate 86 permits open communication between reaction channels 88 and provides a greater effective width of the reactant channels as compared to heat exchange channels 89. The insertion of the corrugated or slotted plate has the additional advantage of providing fluid shear as the reactants pass through reactant channels 88 and further enhance mixing. A perforated insert plate arrangement is shown in U.S. Pat. No. 5,538, 700; the contents of which are hereby incorporated by reference.

Figure 13:
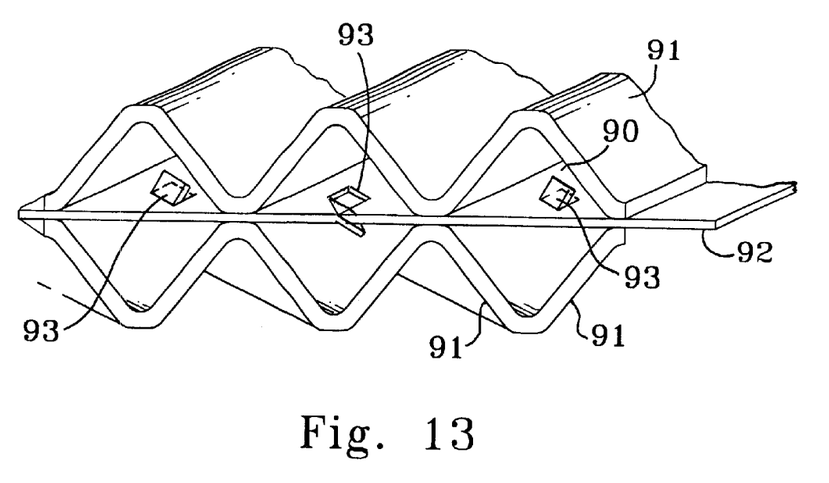
FIG. 13 is perspective view of a modified heat exchange channel for this invention.

FIGS. 13 displays an additional method for introducing shearing on the reactant fluid as it passes through the reaction channels. FIG. 13 shows an arrangement of reaction channels 90 defined by corrugated plates 91. A shear inducing plate 92 is sandwiched between corrugated plates 91. Punched tabs 93 extending transversely outward from plate 92 present sharp edges for additional shearing action on the fluid as it passes through the reaction channels 90.

What is claimed is:

1. A tubular reactor for the plug flow reaction of one or more reactants in the presence of a gas, liquid, or mixed phase fluids, said apparatus comprising:

(a) a containment conduit having an inlet and an outlet end for passing fluid from the inlet end to the outlet end of the conduit and establishing a flow direction through said conduit;

(b) at least two spaced apart mixing sections comprising a stack of plates defining heat exchange flow channels and reactant flow channels, said stack of plates retaining turbulence inducing structures that extend transversely across the reactant flow channels, said stack of plates defining reactant channel inlets at the upstream end of the mixing section and reactant channel outlets for the reactant channels at the downstream end of the mixing section and said stack of plates being stacked in a direction transverse to one of the heat exchange flow channels and the reactant flow channels such that plates on transverse sides of the stack of plates press against the inside wall of the containment conduit to obstruct circumferential flow of fluid around the conduit and other plates in the stack of plates having ends that are spaced apart from the inside wall of the containment conduit;

(c) a distribution manifold for distributing a heat exchange fluid to the sides of the heat exchange channels defined by an annular volume between the inside wall of the conduit and the ends of the plates that are spaced apart from the inside wall of the containment conduit;

(d) a collection manifold for collecting a heat exchange fluid from the sides of the heat exchange channels defined by an annular volume between the inside wall of the conduit and the ends of the plates that are spaced apart from the inside wall of the containment conduit;

and (e) annular rings covering the annular volume at the upstream and downstream ends of the mixing sections that are welded to the conduit to hold and seal the mixing sections in place.

2. The reactor of claim 1 wherein corrugations defined by said plates define the turbulence inducing structure.

3. The reactor of claim 1 wherein the plates define essentially planar channels.

4. The reactor of claim 3 wherein the channels in adjacent mixing devices extend in a direction normal to each other.

5. The reactor of claim 1 wherein a first nozzle delivers the heat exchange fluid to one side of the annular volume and a second nozzle withdraws the heat exchange fluid from an opposite side of the annular volume.

6. The reactor of claim 5 wherein the distribution manifold distributes the heat exchange fluid to a first group of said heat exchange channels on a first side of said mixing device, a recirculation manifold communicates said first group of heat exchange channels with a second group of heat exchange channels on an opposite side of said mixing device and the collection manifold collects heat exchange fluid from said second group of heat exchange channels on the first side of said heat exchange device.

7. The reactor of claim 1 wherein a perforated sheet extends between the plates defining the heat exchange channels to cause a shearing action on the reactant fluid as it passes through heat exchange channels.

8. The reactor of claim 1 wherein said plates comprise imperforate corrugated plates and a perforated corrugated plate extends between the imperforate corrugated plates that define each heat exchange channel.

* * * * *